(12) United States Patent
Hennessy et al.

(10) Patent No.: US 10,941,819 B2
(45) Date of Patent: Mar. 9, 2021

(54) VISCOUS CLUTCH AND METHOD OF OPERATION

(71) Applicant: Horton, Inc., Roseville, MN (US)

(72) Inventors: David R. Hennessy, Burnsville, MN (US); Derek Savela, St. Paul, MN (US)

(73) Assignee: Horton, Inc., Roseville, MN (US)

( * ) Notice: Subject to any disclaimer, the term of this patent is extended or adjusted under 35 U.S.C. 154(b) by 198 days.

(21) Appl. No.: 16/216,414

(22) Filed: Dec. 11, 2018

(65) Prior Publication Data

US 2019/0107158 A1  Apr. 11, 2019

Related U.S. Application Data

(63) Continuation of application No. PCT/US2017/031868, filed on May 10, 2017.
(Continued)

(51) Int. Cl.
*F16D 35/02* (2006.01)
*H01F 41/071* (2016.01)
(Continued)

(52) U.S. Cl.
CPC ........ *F16D 35/024* (2013.01); *F16K 31/0675* (2013.01); *H01F 7/081* (2013.01);
(Continued)

(58) Field of Classification Search
CPC ...... F16D 35/02; F16D 35/024; H01F 41/071; H01F 7/081; F16K 31/0675
See application file for complete search history.

(56) References Cited

U.S. PATENT DOCUMENTS

| 3,215,235 A | 11/1965 | Kamm |
| 3,444,748 A | 5/1969 | Sutaruk |

(Continued)

FOREIGN PATENT DOCUMENTS

| CN | 205207220 U | 5/2016 |
| DE | 3148872 A1 | 6/1983 |

(Continued)

OTHER PUBLICATIONS

Supplementary European Search Report and European Search Opinion in corresponding European Patent Application No. 17820732.0 dated Feb. 17, 2020.
(Continued)

*Primary Examiner* — Huan Le
(74) *Attorney, Agent, or Firm* — Westman, Champlin & Koehler, P.A.

(57) ABSTRACT

A viscous clutch includes a shaft, a rotor disk, a housing having a base, a working chamber, a reservoir fluidically connected to the working chamber, a valve, an electromagnetic coil, and a flux guide that passes through the housing. The rotor disk includes a conductive portion made of a magnetic flux conductive material that forms a hub of the rotor disk that contacts the shaft and another portion. The base includes a hub with an axially-extending ring, and an armature of the valve is located radially outward of the axially-extending ring. The electromagnetic coil is located at an opposite side of the rotor disk from the reservoir. A magnetic flux circuit extends from the electromagnetic coil to the flux guide, then to the armature of the valve, then to the conductive portion of the rotor disk, then to the shaft, and then back to the electromagnetic coil.

19 Claims, 7 Drawing Sheets

Related U.S. Application Data

(60) Provisional application No. 62/356,101, filed on Jun. 29, 2016.

(51) Int. Cl.
  H01F 7/08 (2006.01)
  F16K 31/06 (2006.01)
  F01P 5/04 (2006.01)

(52) U.S. Cl.
  CPC .............. H01F 41/071 (2016.01); *F01P 5/04* (2013.01); *Y10T 29/49071* (2015.01)

(56) References Cited

U.S. PATENT DOCUMENTS

| | | | |
|---|---|---|---|
| 3,498,431 A | 3/1970 | Sutaruk | |
| 3,757,914 A | 9/1973 | Elmer | |
| 4,046,239 A | 9/1977 | Tinholt | |
| 4,346,797 A | 8/1982 | Bopp | |
| 4,526,257 A | 7/1985 | Mueller | |
| 4,556,138 A | 12/1985 | Martin et al. | |
| 4,987,986 A | 1/1991 | Kennedy et al. | |
| 5,030,865 A * | 7/1991 | Rockey | F16D 35/024 310/78 |
| 5,320,206 A | 6/1994 | Maejima | |
| 5,511,643 A | 4/1996 | Brown | |
| 5,992,594 A | 11/1999 | Herrle et al. | |
| 5,996,911 A | 12/1999 | Gesk et al. | |
| 6,419,064 B1 | 7/2002 | Krammer et al. | |
| 6,443,283 B1 * | 9/2002 | Augenstein | F16D 35/024 192/58.61 |
| 6,481,390 B1 | 11/2002 | Robb | |
| 6,695,113 B2 | 2/2004 | Lutz | |
| 6,935,478 B2 | 8/2005 | Drager et al. | |
| 7,083,032 B2 | 8/2006 | Boyer | |
| 7,191,883 B2 | 3/2007 | Angermaier | |
| 7,278,524 B2 | 10/2007 | Boyer | |
| 7,588,132 B2 | 9/2009 | Shiozaki | |
| 7,854,307 B2 | 12/2010 | Hennessy et al. | |
| 7,913,825 B2 | 3/2011 | Boyer | |
| 7,913,826 B2 | 3/2011 | Boyer | |
| 7,938,240 B2 | 5/2011 | Hennessy et al. | |
| 7,946,400 B2 | 5/2011 | Hennessy et al. | |
| 7,980,373 B2 | 7/2011 | Boyer | |
| 8,100,241 B2 | 1/2012 | Hennessy et al. | |
| 8,186,494 B2 | 5/2012 | Boyer | |
| 8,596,438 B2 | 12/2013 | Boyer | |
| 8,616,357 B2 | 12/2013 | Boyer | |
| 8,881,881 B2 | 11/2014 | Gevers et al. | |
| 8,887,888 B2 | 11/2014 | Hennessy et al. | |
| 2002/0096132 A1 | 7/2002 | Stretch et al. | |
| 2006/0243554 A1 | 11/2006 | May | |
| 2007/0205071 A1 | 9/2007 | Light | |
| 2008/0257677 A1 | 10/2008 | Schultheiss et al. | |
| 2013/0284556 A1 | 10/2013 | Gevers et al. | |
| 2014/0216881 A1 | 8/2014 | Tilly | |
| 2015/0219168 A1 * | 8/2015 | Kubota | F16D 35/024 192/58.5 |
| 2016/0003311 A1 * | 1/2016 | Krammer | F16D 35/02 192/58.8 |

FOREIGN PATENT DOCUMENTS

| | | |
|---|---|---|
| DE | 4011528 A1 | 10/1991 |
| DE | 102011076745 A1 | 12/2012 |
| EP | 0350585 B1 | 4/1993 |
| EP | 0407750 B1 | 8/1993 |
| EP | 2811133 A1 | 12/2014 |
| EP | 2902651 A2 | 8/2015 |
| JP | 5455690 B2 | 3/2014 |
| WO | WO2014047430 A1 | 6/1983 |
| WO | WO2004051107 A2 | 6/2004 |
| WO | WO2009030574 A1 | 3/2009 |
| WO | WO2014004335 A1 | 1/2014 |
| WO | WO2014158397 A1 | 10/2014 |
| WO | WO2014159374 A1 | 10/2014 |

OTHER PUBLICATIONS

Office Action in corresponding Chinese application No. 201780040299.5 dated Dec. 16, 2019.
International Search Report and Written Opinion issued in International Application No. PCT/US2017/031868 dated Jul. 28, 2017.

* cited by examiner

VISCOUS CLUTCH AND METHOD OF OPERATION

CROSS-REFERENCE TO RELATED APPLICATIONS

This application is a continuation of International Application No. PCT/US2017/031868, filed May 10, 2017, and claims priority to U.S. Provisional Application Ser. No. 62/356,101, the contents of each of which are hereby incorporated by reference in their entireties.

FIELD

The present invention relates generally to clutches, and more particularly to viscous clutches and components suitable for use with viscous clutches and methods of using the same.

BACKGROUND

Clutches (also called drives or couplings) are used in a variety of contexts to selectively control torque transmission between an input and an output. For instance, fan clutches are used to control rotation of a fan, such as a cooling fan for an automotive or industrial application. Controlled operation of a cooling fan provides all the benefits associated with cooling flows when the clutch is engaged, but also allows the fan to be turned off when not needed, thereby reducing parasitic losses and increasing fuel efficiency. Turning off a cooling fan can also allow additional power to be diverted to other uses.

In certain light duty applications, such as for small industrial equipment like miniature excavators, generators, light towers, and material handling equipment, there are severe space constraints available that limit the use of a fan clutch. Many of these applications do not include any fan clutch and currently use a fan that is directly driven by a pulley on the engine. These types of "always on" cooling fan arrangements are compact, but are far from optimal in terms of fuel burn and parasitic losses. The space to introduce a fan drive was never taken into account in the design. Furthermore, many of these applications utilize a fan that is mounted on the water pump, primarily so that the same belt drive system can be used to power both the water flow and the fan, saving cost and complexity. However, many of the water pumps were designed to support the mass of the fan only. Increased weight introduced by a fan clutch may require larger bearings in the water pump, increasing size and cost of the water pump. Moreover, because the fan (and fan clutch) is hung in front of the water pump bearing system, the length is an equally large factor in the amount of overhung load need to be carried by the bearing system.

While some relatively small bimetal-controlled viscous fan clutches are available, many industrial applications utilize blower fans rather than sucker fans, meaning that relatively hot air is blown out from an engine compartment rather than relatively cool air being sucked into the engine compartment. Bimetal controlled viscous clutches are not suitable for such blower applications, because the heat from the engine compartment air would tend to keep the clutch engaged all or almost all of the time.

Therefore, it is desired to provide a controllable fan drive that has a compact size suitable for light duty applications. Furthermore, or in the alternative, it is desired to provide an electromagnetic coil assembly suitable for suit in a compact viscous clutch.

SUMMARY

In one aspect, a viscous clutch includes an input member, an output member, a working chamber defined between the input member and the output member, a reservoir to hold a supply of a shear fluid, a valve configured to control a flow of the shear fluid between the reservoir and the working chamber along a fluid circuit that fluidically connects the reservoir and the working chamber, a bearing, and an electromagnetic coil supported by the bearing. The electromagnetic coil includes a coil housing and a winding that forms multiple turns within an interior volume of the coil housing, wherein the coil housing has a stepped configuration to at least partially accommodate the bearing within a first step. Selective energization of the electromagnetic coil actuates the valve.

In another aspect, a method includes winding a wire within an interior volume of an electromagnetic coil housing to provide a coil, and engaging a bearing with the electromagnetic coil housing at the step. The wire makes multiple turns within the interior volume so as to span a radially outer volume and an adjoining radially inner volume. The radially outer volume is located radially outward of a step formed by a wall of the electromagnetic coil housing.

In another aspect, an electromagnetic coil assembly for use with a clutch includes a bearing that has inner and outer races and a plurality of rolling elements positioned between the inner and outer races, a winding, and a coil housing defined by a wall supported on the outer race of the bearing. The coil housing further defines an interior volume in which a plurality of turns of the winding are located, the turns of the winding located opposite the bearing across the wall. The interior volume includes a first portion having a first axial depth and a second portion having a second axial depth. The first axial depth is greater than the second axial depth. The first portion is located radially outward of the outer race of the bearing and the second portion extends radially inward of the outer race of the bearing.

In another aspect, a viscous clutch includes a shaft, a rotor disk rotationally affixed to the shaft to rotate at all times with the shaft, a housing having a base and a cover, a working chamber defined between the rotor disk and the housing, a reservoir to hold a supply of a shear fluid, the reservoir fluidically connected to the working chamber by a fluid circuit and carried by the rotor disk, a valve configured to control a flow of the shear fluid between the reservoir and the working chamber along the fluid circuit, an electromagnetic coil that can be selectively energized to control actuation of the valve, and a flux guide that passes through the housing. The rotor disk includes a conductive portion made of a magnetic flux conductive material and another portion made of a different material. The conductive portion forms a hub of the rotor disk that contacts the shaft. The base includes a hub with an axially-extending ring, and an armature of the valve is located radially outward of the axially-extending ring. The electromagnetic coil is located at an opposite side of the rotor disk from the reservoir. A magnetic flux circuit extends from the electromagnetic coil to the flux guide, then to the armature of the valve, then to the conductive portion of the rotor disk, then to the shaft, and then back to the electromagnetic coil. A torque coupling between the rotor disk and the housing is selectively provided as a function of a volume of the shear fluid present in the working chamber.

In another aspect, a method of operating a viscous clutch includes energizing an electromagnetic coil to generate magnetic flux, passing the magnetic flux from the electromagnetic coil to a flux guide in a housing of the viscous clutch across a first air gap, passing the magnetic flux from the first flux guide to an armature of a valve across a second air gap, passing the magnetic flux from the armature of a valve to a conductive hub portion of a rotor to across a third air gap, actuating the valve to control flow of a shear fluid within the viscous clutch as a function of movement of the armature, passing the magnetic flux from the conductive hub portion of the rotor through a live shaft, and passing the magnetic flux from the live shaft to the electromagnetic coil across a fourth air gap.

In another aspect, a viscous clutch includes a shaft, a rotor disk rotationally affixed to the shaft to rotate at all times with the shaft, a housing, a working chamber defined between the rotor disk and the housing, a reservoir to hold a supply of the shear fluid and fluidically connected to the working chamber by a fluid circuit, a valve configured to control a flow of the shear fluid between the reservoir and the working chamber along the fluid circuit, an electromagnetic coil, a first flux guide that passes through the housing, and a second flux guide that passes through the housing and is located outward of the first flux guide. The rotor disk includes a conductive portion made of a magnetic flux conductive material and another portion made of a different material. The valve includes an armature. The electromagnetic coil is located at an opposite side of the rotor disk from the reservoir. The reservoir is carried by the rotor disk. A magnetic flux circuit extends from the electromagnetic coil to the first flux guide, then to the conductive portion of the rotor disk, then to the armature of the valve, then to the second flux guide, and then back to the electromagnetic coil. A torque coupling between the rotor disk and the housing is selectively provided as a function of a volume of a shear fluid present in the working chamber. Selective energization of the coil controls actuation of the valve.

In yet another aspect, a method of operating a viscous clutch includes energizing an electromagnetic coil to generate magnetic flux, passing the magnetic flux from the electromagnetic coil to a first flux guide in a housing of the viscous clutch across a first air gap, passing the magnetic flux from the first flux guide to a conductive portion of a rotor across a second air gap, passing the magnetic flux from the conductive portion of the rotor to an armature of a valve across a third air gap, actuating the valve to controls flow of a shear fluid within the viscous clutch as a function of movement of the armature, passing the magnetic flux from the armature to a second flux guide in the housing across a fourth air gap, and passing the magnetic flux from the second flux guide to the electromagnetic coil across a fifth air gap.

The present summary is provided only by way of example, and not limitation. Other aspects of the present invention will be appreciated in view of the entirety of the present disclosure, including the entire text, claims and accompanying figures.

Figure 1:
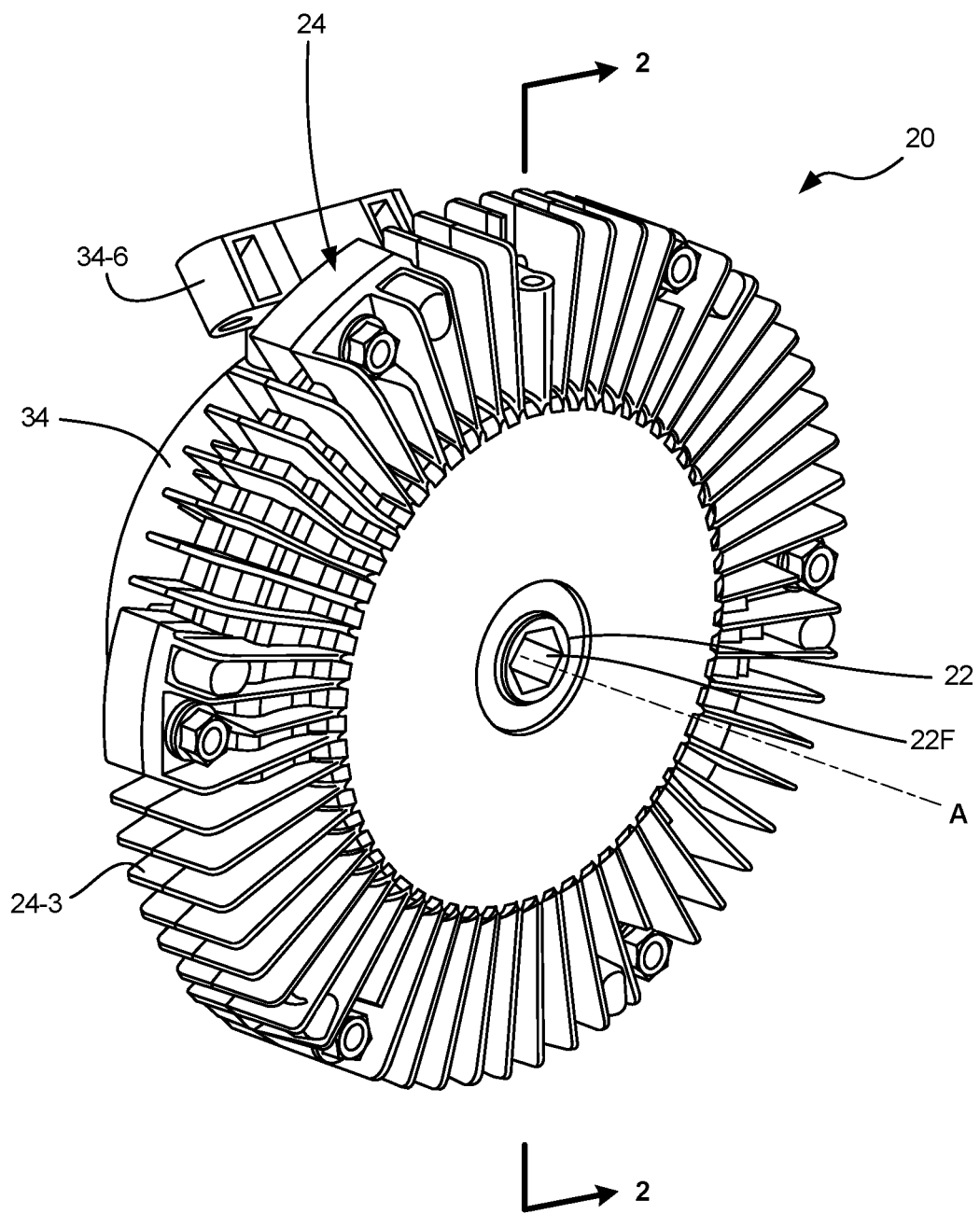
FIG. 1 is a perspective view of an embodiment of a viscous clutch according to the present invention.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, present invention provides an electronically controlled viscous clutch, suitable for use as a fan clutch, with an electromagnetic coil on an engine side of the clutch, in which the clutch is extremely narrow (i.e., short in axial length) in order to reduce an overhung load supported by an associated bearing system (e.g., a bearing system for a water pump that provides a torque output to the clutch). It has been found that a clutch with a relatively short axial length can promote a compact clutch design with relatively low mass, and to facilitate reduced overhung loading. Although numerous features and benefits of the invention will be recognized in view of the entirety of the present disclosure, including the accompanying figures, a number of features of the clutch help minimize the axial length, including: a stepped electromagnetic coil, a magnetic flux circuit that passes through an input rotor disk to actuate a valve armature located between the electromagnetic coil and the rotor disk, and a shaft that passes entirely through a housing of the clutch.

Figure 2:
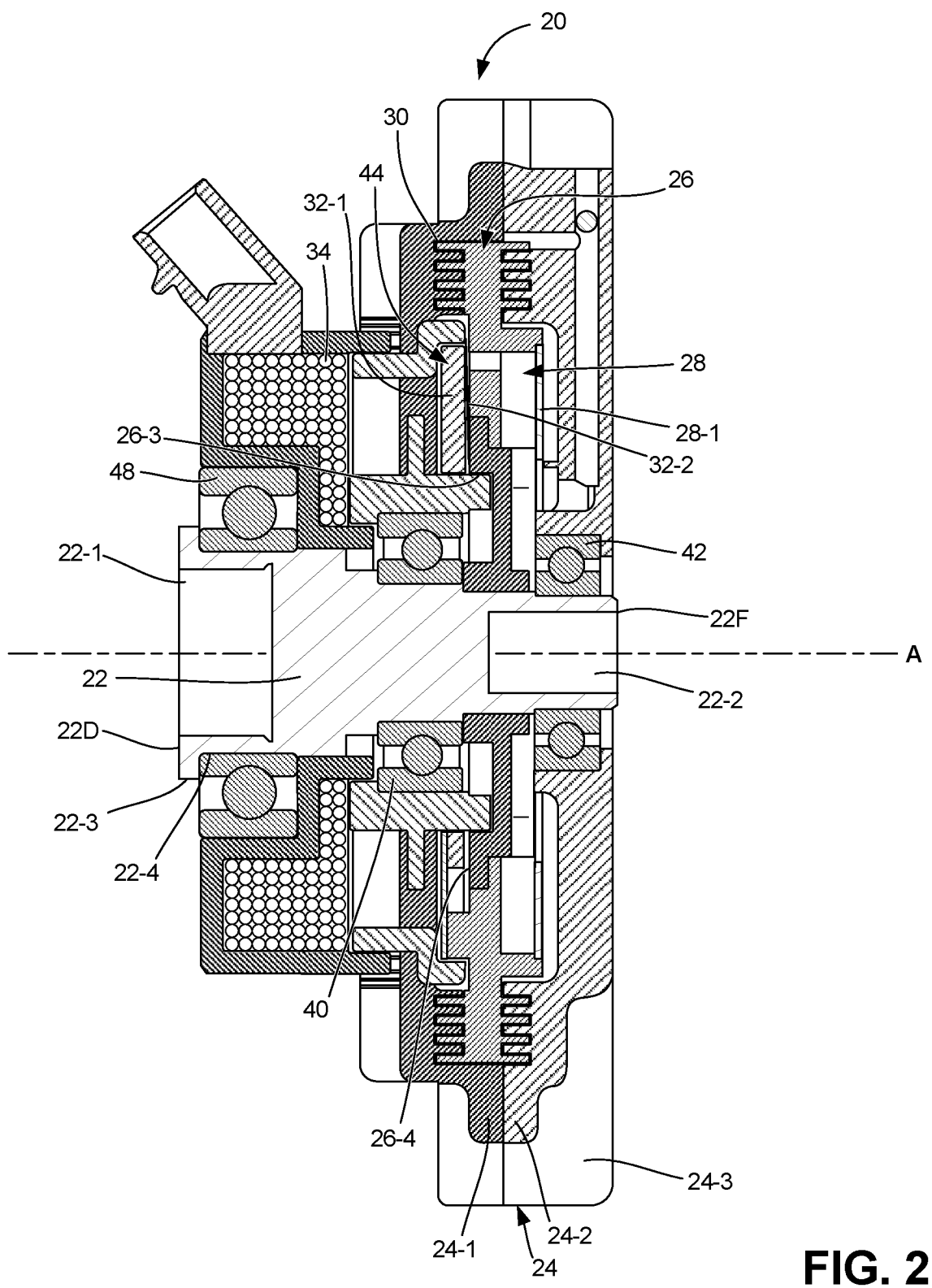
FIG. 2 is a cross-sectional view of the clutch, taken along line 2-2 of FIG. 1.

FIG. 1 is a perspective view of an embodiment of a viscous clutch 20, and FIG. 2 is a cross-sectional view of the clutch 20 taken along line 2-2 of FIG. 1. As shown in FIGS. 1 and 2, the clutch 20 includes a shaft 22, a housing 24, a rotor 26, a reservoir 28, a working chamber 30, a valve (or valve assembly) 32, and an electromagnetic coil 34. An axis A is illustrated that defines a rotational axis of the clutch 20. It should be noted that the illustrated embodiment is disclosed merely by way of example and not limitation, and numerous alternative embodiments are possible, some features of which are described in the text that follows.

The shaft 22 is located at a center of the clutch 20, and extends through an entire axial length of the clutch 20 including the housing 24. The shaft 22 can act as a primary structural support for the entire clutch 20, which is to say that mass of the clutch 20 can be supported primarily by the shaft 22, and in the illustrated embodiment the mass of the clutch 20 is essentially entirely carried by the shaft 22. As shown in the embodiment of FIG. 1, the shaft 22 includes a first engagement feature 22-1 at a first or driving end 22D (also called the rear end) and a second engagement feature 22-2 at an opposite second or front (or driven) end 22F. The shaft 22 can further have a stepped configuration, with a larger diameter at the driving end 22D and incrementally decreasing to a smaller diameter at the front end 22F. The shaft 22 in the illustrated embodiment is a "live" or driven input shaft, meaning that the shaft 22 accepts a torque input to the clutch 20 and rotates whenever the torque input is present. The shaft 22 then distributes the torque input to other components of the clutch.

The first engagement feature 22-1 allows engagement with an external prime mover (not shown), such as an engine drive shaft or a shaft of a water pump, that provides the torque input. In one embodiment, the first engagement feature 22-1 is configured as an internal (female) thread, though in alternate embodiments other engagement mechanisms can be used (e.g., a flange for a bolted connection, a sheave/pulley, etc.). Outward of the internal first engagement feature 22-1 can be a small axial stop 22-3 and a cylindrical outer surface 22-4.

The second engagement feature 22-2 allows suitable tooling to engage the shaft 22 to attach or remove the entire clutch 20 from the prime mover. For instance, second engagement feature 22-2 can be an Allen head socket, or other suitable type of socket (e.g., Reynolds, Torx®, etc.). Configuration of the second engagement feature 22-2 as an internal (i.e., female) structure helps to reduce the overall axial length of the clutch 20, though other configurations are possible in alternate embodiments, as discussed further below.

The presence of the second engagement feature 22-2 at the front end 22F of the shaft 22 helps eliminate the need for an external engagement feature such as a flange or a hexagonal tooling-accepting feature (i.e., wrench flats) at or near the driving end 22D, and allows the driving end 22D of the shaft 22 to solely internally engage a driven component of the prime mover. Such an internal engagement at the driving end 22D of the shaft 22 helps to shorten the overall axial length of the clutch 20, without appreciably increasing radial dimensions of the clutch 20. Axial clutch length reduction is possible, in part, because surrounding components such as the electromagnetic coil 34 can axially overlap the driving end 22D of the shaft 22 having an internal first engagement features 22-1 more extensively than an external engagement feature would normally permit, due to the need to maintain tool access to such an external engagement feature. Moreover, the front end 22F of the shaft will typically be more conveniently accessible than the driving end 22D in many applications, such as in fan clutch applications in which fan blades secured to the clutch 20 restrict access to the driving end 22D within the confines of an engine compartment.

The housing 24 includes a base 24-1 and a cover 24-2 secured to each other in a rotationally fixed manner. The housing 24 is rotationally supported on the shaft 22, allowing the housing 24 to selectively rotate relative to the shaft 22 as a function of the operational state of the clutch 20 (i.e., from approximately 0% to approximately 100% of the rotational speed of the shaft 22). In this respect, where the shaft 22 (and rotor 26) accepts a torque input to the clutch 20, the housing 24 can act as an output or output member of the clutch 20. Cooling fins 24-3 can be provided on external surfaces of the housing 24, on the base 24-1 and/or the cover 24-2, to facilitate heat dissipation to ambient air.

In the illustrated embodiment, the base 24-1 is supported on the shaft 22 by a rear bearing 40 and the cover 24-2 is supported on the shaft 22 by a front bearing 42. The rear and front bearings 40 and 42 are located on opposite sides of the rotor 26, and are axially spaced apart from each other. The bearings 40 and 42 are each single-row ball bearings in the illustrated embodiment, but could have other configurations in alternate embodiments. Many prior art viscous clutches instead have a single bearing set on the driving (engine) side of the clutch in order to support both the clutch mass and the mass of an output device (e.g., fan), which can be either a single or double row bearing depending on the application. In such single bearing prior art clutches, a single-row bearing can be problematic because there is less load capability and the potential for deflection around the single row is relatively large when compare to a double-row bearing. Yet in such prior art clutches a double-row bearing occupies a relatively large axial length in a crucial axially central portion of the clutch, which tends to increase the overall axial length of the clutch undesirably. Use of two single-row bearings 40 and 42 has three primary benefits. First, the presence of two spaced apart bearings 40 and 42 allows for relatively high stability and low deflection when compared to one single-row bearing. Second, the additional front bearing 42 can be placed into the cover 24-2 of the housing 24 in a space at or near the front end 22F of the shaft 22 that is generally unused, which does not significantly add to the overall axial length of the clutch 20. Finally, the front bearing 42 in the cover 24-2 provides a sealed opening in the cover 24-2 for the shaft 22. This enables the addition of the second engagement feature 22-2 on the shaft 22, accessible from the front side of the clutch 20, for installation and removal of the entire clutch 20 relative to an engine or water pump, for instance.

The housing 24 can be made of aluminum or another suitable material or materials. The cover 24-2 can be a die cast part, which has the benefit of being a single part and keeping a viscous shear fluid (e.g., silicone oil) in the clutch 20 and dirt and debris out of the clutch 20. As discussed below, inserts can be provided in portions of the housing 24 (e.g., in the base 24-1) for magnetic flux conduction. One or more seals (not shown) can be provided along the housing 24 to further help retain shear fluid within the clutch 20, although in the illustrated embodiment the front and rear bearings 42 and 40 seal the shear fluid inside the housing 24 without the need for additional dedicated seal elements. Furthermore, an output device (not shown) such as a fan can be secured to the housing 24 to accept a torque output from the clutch 20.

The rotor 26 is positioned at least partially within the housing 24, and preferably entirely within the housing 24, and can have a disk-like shape (accordingly, the rotor 26 can be called a rotor disk). The rotor 26 is rotationally fixed to the shaft 22, and rotates at all times with the shaft 22. In this respect, where the shaft 22 accepts a torque input, the rotor 26 can function as the input or input member of the clutch 20.

In the illustrated embodiment, the rotor 26 has a conductive portion 26-1 and a non-conductive portion 26-2, where "conductive" in this instance refers to magnetic flux conductivity. The conductive portion 26-1 can be made of steel or another suitable magnetic flux-conducing material (e.g., any ferromagnetic material), and the non-conductive portion 26-2 can be made of aluminum or another suitable material that does not readily conduct magnetic flux. The conductive portion 26-1 can be configured as a radially inner hub of the rotor 26 that can be directly secured to the shaft 22 and is spaced from and separated from the reservoir 28. Moreover, in the illustrated embodiment the conductive portion 26-1 abuts both the rear and front bearings 40 and 42. The non-conductive portion 26-2 can be located at a radially outer part of the rotor 26. In the illustrated embodiment, the conductive portion 26-1 includes an axial offset region that includes a cylindrical portion with an inward-facing cylindrical surface 26-3, as well as an exposed axially rearward facing portion 26-4. Furthermore, in the illustrated embodiment, the conductive portion 26-1 forms the entirety of the rotor 26 over a given radial extent (e.g., to or beyond the cylindrical surface 26-3), and, in that respect, is a structural component that is distinguished from a non-structural flux guide insert that is embedded in or otherwise passes through surrounding structural material of a rotor solely to conduct magnetic flux. The conductive portion 26-1 can also extend radially outward from the shaft 22 over a significant distance, making the conductive portion 26-1 more than a mere hub or inner sleeve. As shown in the illustrated embodiment, the conductive portion 26-1 extends beyond the axial offset region and the cylindrical surface 26-3, but is located radially inward of the working chamber 30. Moreover, in the illustrated embodiment, the conductive portion 26-1 extends from the shaft 22 to a location at or radially outward from a hub of the base 24-1 of the housing 24 (and/or an inner hub/second flux guide, discussed below) as well as outward of the rear bearing 40.

The reservoir 28 provides a storage volume to hold a supply of the shear fluid. In the illustrated embodiment, the reservoir 28 is provided on or within the rotor 26. A plate 28-1 of the reservoir 28 can be attached to and carried by the rotor 26 to form part of a boundary to help retain the shear fluid and to separate the reservoir 28 from other portions of the clutch 20. The plate 28-1 can be located in an interior of the clutch 20, and can be arranged at a front side of the rotor 26 that faces the cover 24-2. All or part of the shear fluid can be stored in the reservoir 28 when not needed for engagement of the clutch 20. In the illustrated embodiment, the reservoir 28 is carried by the rotor 26, such that the reservoir 28 and shear fluid contained within both rotate with the rotor 26. In this way, when the shaft 22 and the rotor 26 act as the input to the clutch 20, the reservoir 28 rotates at input speed whenever there is a torque input to the clutch 20, which imparts kinetic energy to the shear fluid in the rotor-carried reservoir 28 to facilitate relatively quick clutch engagement response times. An outlet bore 44 is provided along the boundary of the reservoir 28 to allow the shear fluid to pass to the working chamber 30 along a fluid circuit of the clutch 20. In the illustrated embodiment, the rotor 26 forms part of the boundary of the reservoir 28, and the outlet bore 44 passes through the rotor 26. More specifically, in the illustrated embodiment the outlet bore 44 passes substantially axially through the non-conductive portion 26-2 of the rotor 26 at a location outward from the conductive portion 26-1.

The working chamber 30 is defined (and operatively positioned) between the rotor 26 and the housing 24. The working chamber 30 can extend to both sides of the rotor 26. As explained further below, selective introduction of the shear fluid (e.g., silicone oil) to the working chamber 30 can engage the clutch 20 by creating a viscous shear coupling to transmit torque between the rotor 26 and the housing 24, with the degree of torque transmission (and associated output speed) being variable as a function of the volume of shear fluid present in the working chamber 30. Concentric annular ribs, grooves and/or other suitable structures can be provided on the rotor 26 and housing 24 to increase surface area along the working chamber 30 and promote a shear coupling when the shear fluid is present in the working chamber 30, as is known in the art. Moreover, openings (not shown) can be provided in an outer diameter region of the rotor 26 to allow the shear fluid in the working chamber 30 to move between opposite side of the rotor 26, in a manner well-known in the art.

The shear fluid is pumped from the working chamber 30 back to the reservoir 28 along a return bore 46, which is located in the housing 24 in the illustrated embodiment. The pumping of the shear fluid into the return bore 46 can occur continuously using a dam or baffle (not specifically shown), as is known in the art. Such a dam can be located on the housing 24 adjacent to the inlet of the return bore 46. The fluid circuit of the clutch 20 therefore extends from the reservoir 28 to the working chamber 30 through the outlet bore 44, and then from the working chamber 30 back to the reservoir 28 through the return bore 46.

The valve 32 selectively controls flow of the shear fluid between the reservoir 28 and the working chamber 30. The clutch 20 can be electromagnetically controlled, meaning that selective energization of the electromagnetic coil 34 can control operation of the valve 32 in order to control the volume of the shear fluid present in the working chamber 30, and in turn the degree of engagement and torque transmission between the input and output members. In the illustrated embodiment, all moving parts of the valve 32 are contained within the housing 24, and the valve 32 is positioned in between the rotor 26 and the electromagnetic coil 34 at a rear side of the rotor 26. Although a magnetic flux circuit of the clutch 20 and details of the valve 32 are described further below, in brief, magnetic flux from the electromagnetic coil 34 can move (e.g., axially pivot) an armature 32-1, which in turn can move (e.g., concurrently pivot by pressing against) a valve element 32-2 (e.g., reed valve). The valve element 32-2 can selectively limit or prevent flow of the shear fluid along the fluid circuit. In the illustrated embodiment, the valve element 32-2 covers and uncovers the outlet bore 44 to selectively control flow of the shear fluid out of the reservoir 28. In some embodiments, referred to as a "fail on" configuration, the valve element 32-2 can be mechanically biased to an open position by default, with energization of the electromagnetic coil 34 causing the valve element 32-2 to move to a closed position that limits or prevents shear fluid flow.

In the illustrated embodiment, the electromagnetic coil 34 is supported on the shaft 22 by a coil bearing 48. More specifically, the electromagnetic coil 34 can be supported at the driving end 22D of the shaft 22 outside of the housing 24, with the coil bearing 48 abutting the axial stop 22-3. The electromagnetic coil 34 is typically rotationally fixed by a tether or the like (not shown), with the coil bearing 48 allowing relative rotation between the non-rotating electromagnetic coil 34 and the rotatable shaft 22. Further details of the configuration of the electromagnetic coil 34 are discussed below.

Figure 3:
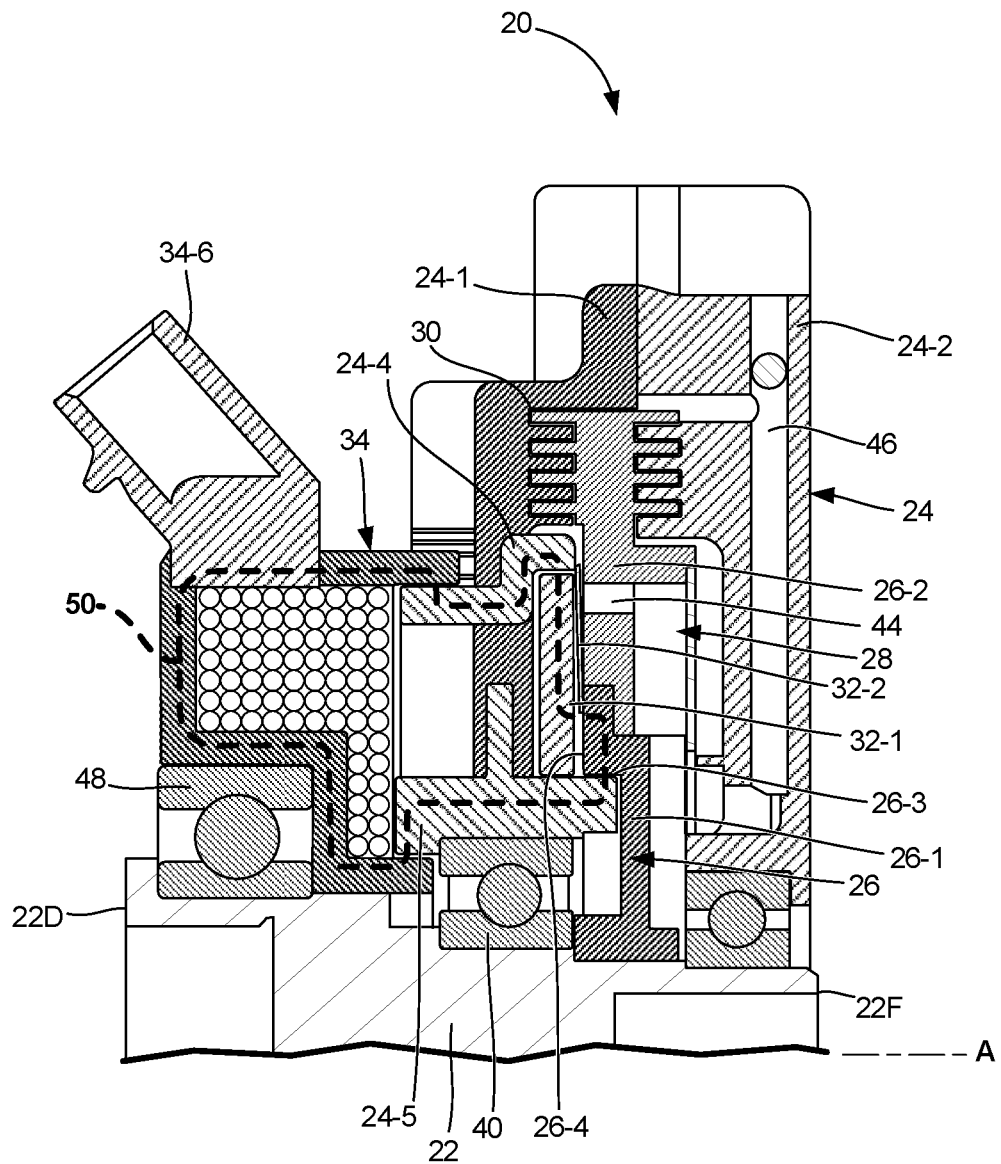
FIG. 3 is a cross-sectional view of a portion of the clutch.

FIG. 3 is a cross-sectional view of a portion of the clutch 20, shown only above the axis A, illustrating a magnetic flux circuit that is represented schematically by a dashed line 50. The housing 24 includes a first flux guide 24-4 and a second flux guide 24-5, each made of a magnetic flux-conductive material. Both the first and second flux guides 24-4 and 24-5 are secured or embedded in the base 24-1 at a rear or driving side of the rotor 26 in the illustrated embodiment. Moreover, each of the first and second flux guides 24-4 and 24-5 can protrude from the base 24-1 at opposite front and/or rear sides. The first and second flux guides 24-4 and 24-5 each allow for the transmission of magnetic flux through the housing 24, which is otherwise typically made of a material like aluminum that does not efficiently transmit magnetic flux. The second flux guide 24-5 can be configured as a hub located at a radially inner portion of the base 24-1, and can directly engage the rear bearing 40. In this respect, the second flux guide 24-5 can be a structural portion of the housing 24 in addition to providing flux transmission functionality. The second flux guide 24-5 can also incorporate an axial stop to engage the rear bearing 40, and a radially-extending portion embedded in the base 24-1. The second flux guide 24-5 can be located radially inward from and spaced apart from the first flux guide 24-4. In the illustrated embodiment, the first flux guide 24-4 has opposite front and rear ends that are radially offset relative to each other in a stepwise manner.

The magnetic flux circuit of the clutch 20 that transmits magnetic flux to facilitate actuation of the valve 32 has the following configuration in the illustrated embodiment. The flux circuit extends from the electromagnetic coil 34 to the first flux guide 24-4 across a first air gap. Next, the flux circuit extends from the first flux guide 24-4 to the armature 32-1 of the valve 32 across a second air gap. The flux circuit then extends from the armature 32-1 of the valve 32 to the conductive portion 26-1 of the rotor 26 across a third air gap. The third air gap can be located adjacent to the axially rearward surface 26-4. Moreover, the third air gap can effectively close when the armature 32-1 is actuated and drawn toward or against the rotor 26. Next, the flux circuit extends from the conductive portion 26-1 of the rotor 26 to the second flux guide 24-5 across a fourth air gap. The fourth air gap can be positioned adjacent to the cylindrical portion 26-3. Lastly, the flux circuit extends from the second flux guide 24-5 back to the electromagnetic coil 34 across a fifth air gap.

Some aspects of the flux circuit in the illustrated embodiment of the clutch 20 are as follows. Any or all of the first, second, fourth and fifth air gaps can be oriented radially. Radially-oriented air gaps in a flux circuit can be kept relatively small, with relatively tight tolerances, and help to promote efficient and consistent flux transmission. The third air gap can be oriented axially. As noted above, the third air gap can effectively close when the armature 32-1 is actuated and drawn toward or against the rotor 26. The first and second air gaps can be located at approximately the same radial distance from the axis A, and magnetic flux passing from the armature 32-1 from the electromagnetic coil 34 can cross both the first and second air gaps in a radially inward direction, due to the radial offset of the first flux guide 24-4. The fifth air gap can be located outward of a radially inner perimeter of the electromagnetic coil 34, and the first air gap can be located inside of a radially outer perimeter of the electromagnetic coil 34. The entire flux circuit can be located outward of the bearings 40 and 48, and, aside from passing through the conductive portion 26-1 of the rotor 26 can be arranged at a driving or rear side of the clutch 20.

Figure 4:
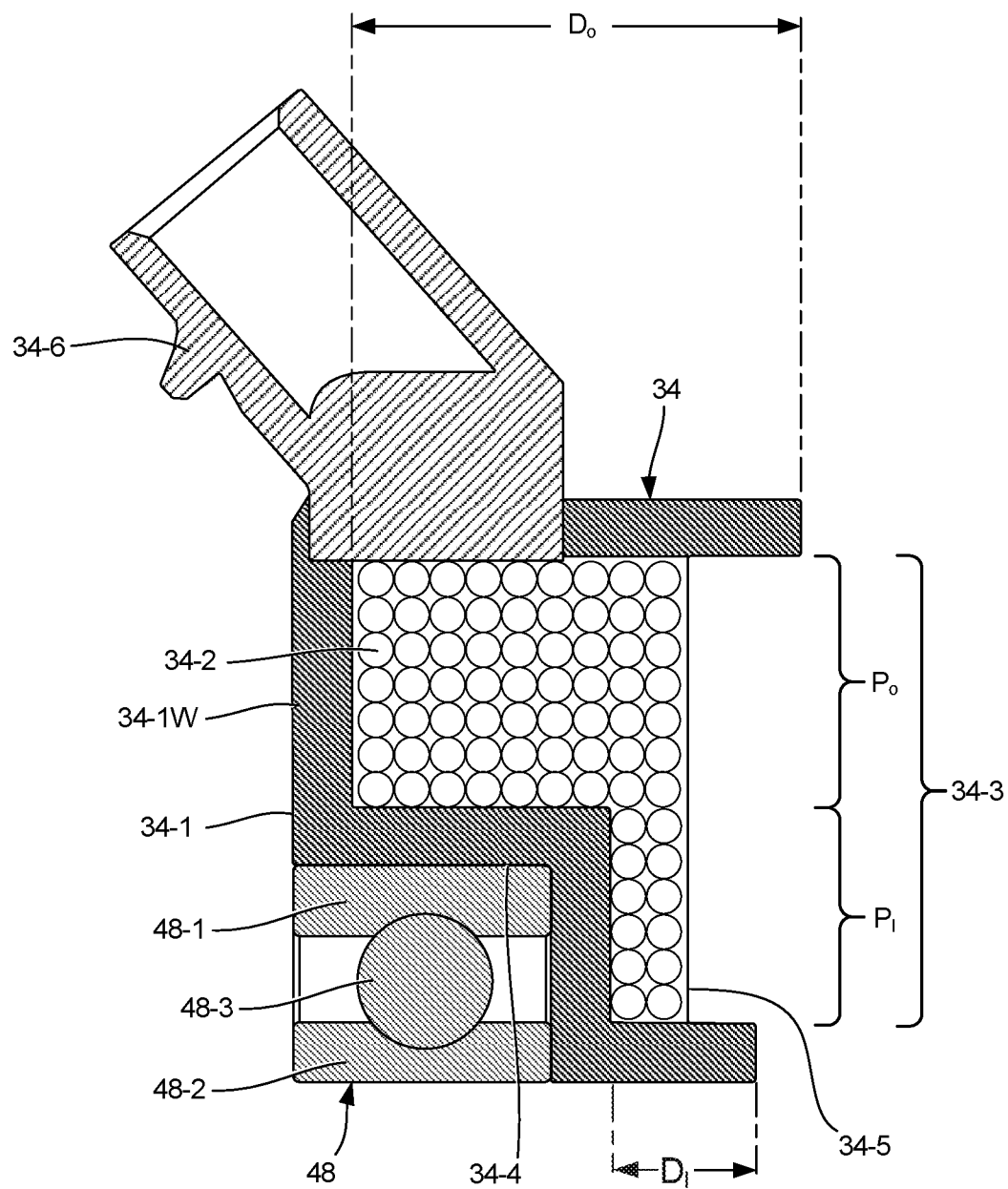
FIG. 4 is a cross-sectional view a portion of an electromagnetic coil assembly of the clutch, shown only above a central axis.

FIG. 4 is a cross-sectional view of a portion of an electromagnetic coil assembly of the clutch 20, shown only above the axis A. The assembly shown in FIG. 4 includes the electromagnetic coil 34 and the coil bearing 48.

The coil bearing 48 in the illustrated embodiment includes an outer race 48-1, and inner race 48-2 and a plurality of rolling elements 48-3. The rolling elements 48-3 are arranged in between the outer and inner races 48-1 and 48-2, and engage each of the races 48-1 and 48-2. In the illustrated embodiment, the coil bearing has a single row of ball-style rolling elements 48-3, though other types of bearings (e.g., roller or needle bearings) could be used in alternate embodiments.

As shown in FIG. 4, the electromagnetic coil 34 includes a coil housing 34-1 and a winding or wire 34-2. The coil housing 34-1 is formed by a wall 34-1W made of a magnetic flux conductive material that defines an interior volume 34-3. In the illustrated embodiment, the coil housing 34-1 is configured as a cup, with the wall 34-1W being open at one face (e.g., a forward face). The wall 34-1W of the coil housing 34-1 also forms a notch or step 34-4 that protrudes toward (or into) the interior volume 34-3. The coil bearing 48 is wholly or partially accommodated within the step 34-4 at an exterior of the wall 34-1W of the coil housing 34-1, that is, at an opposite side of the wall 34-1W from the interior volume 34-3 and the turns of the winding 34-2. The presence of the step 34-4 establishes different portions (or sub-volumes) of the interior volume 34-3, including a radially inner portion $P_I$ and a radially outer portion $P_O$. The inner and outer portions $P_I$ and $P_O$ of the interior volume 34-3 can be contiguous and adjoin each other, and be open to each other without any barrier or obstruction between them. Moreover, the inner and outer portions $P_I$ and $P_O$ can be arranged such that the interior volume 34-3 has an L-shape, when viewed in cross-section. The outer portion $P_O$ has an axial depth (or length) $D_O$, and the inner portion $P_I$ has an axial depth (or length) $D_I$. The axial depth $D_O$ is greater than the axial depth $D_I$ in the illustrated embodiment. The outer portion $P_O$ can be arranged radially outward of the outer race 48-1 of the coil bearing 48, while the inner portion $P_I$ can extend radially inward of the outer race 48-1 can overlap with the rolling elements 48-3 in the radial direction (and optionally also the inner race 48-2 in further embodiments). In other words, the outer portion $P_O$ can be arranged radially outward of the coil bearing 48 while the inner portion $P_I$ can be arranged axially side-by-side or overlapping with the coil bearing 48. In further embodiments, one or more additional steps could be provided in the wall 34-1W of the coil housing 34-1 (such as to accommodate an additional coil bearing) and the interior volume 34-3 could have corresponding additional portions.

The winding 34-2 forms a coil by making a plurality of turns that are located within the interior volume 34-3 of the coil housing 34-1. In the illustrated embodiment, the turns of the winding 34-2 span the inner and outer portions $P_I$ and $P_O$ of the interior volume 34-3, such that the coil formed by the winding 34-2 has a stepped shaped like the coil housing 34-1. Moreover, magnetic flux is generated within both the inner and outer portions $P_I$ and $P_O$ of the interior volume 34-3 when the electromagnetic coil 34 is energized. The configuration of the interior volume 34-3 allows the turns of the winding 34-2 to span at least portions of the coil bearing 48 in both the radial and axial directions, for instance, the turns of the winding 34-2 can radially and axially span the rolling elements 48-3 of the coil bearing 48.

The winding 34-2 can be potted within the coil housing 34-1 using a suitable potting material 34-5. Furthermore, a connection tower 34-6 can be provided to facilitate making electrical connections between the winding 34-2 and a power source (not shown). A tether or other rotation-prevention device (not shown) can also be connected to the electromagnetic coil 34.

The "stepped" configuration of the electromagnetic coil 34 facilitates shortening the overall axial length of the clutch 20. The amount of magnetic flux that can be generated by the electromagnetic coil 34 is primarily related to the number of turns of the winding 34-2 and an amount of current flowing in the winding 34-2. Two alternative designs highlight the challenges that these constraints present. From a purely mass/weight perspective, the most efficient design is to utilize a long and narrow coil where a diameter and thus a circumference of each turn of the winding is reduced or minimized Such a long, narrow coil configuration uses the least amount of material, reducing mass/weight and cost. Because the long, narrow electromagnetic coil is rotatably supported on a shaft, such a long, narrow coil arrangement would tend to consist of an electromagnetic coil and a coil bearing sitting side-by-side on a shaft. The close proximity of the long, narrow electromagnetic coil to the shaft also allows the shaft to be used as part of a magnetic flux circuit to operate a valve, if desired. On the other hand, from an axial length perspective, the most efficient clutch design is to have the electromagnetic coil directly over the coil bearing, putting the electromagnetic coil in a common axial footprint with the coil bearing. However, because each turn of the common axial footprint coil winding is now substantially longer in the circumferential direction (due to a larger diameter outside the coil bearing), the material required to fabricate the electromagnetic coil is significantly larger, adding cost and mass to the design. Furthermore, when the common axial footprint electromagnetic coil is used, the shaft can no longer be easily used as part of the magnetic circuit without the addition of other components (e.g., embedded flux guides). An embodiment of the clutch 20 in which the electromagnetic coil 34 has a stepped configuration is a combination of the two alternative designs (i.e., the long, narrow coil and the common axial footprint designs), which allows benefits of each alternative design to be retained. The turns of the winding 34-2 in the radially inner portion $P_I$ that reside side-by-side with the coil bearing 48 allow for a relatively small turn diameter and close proximity to the shaft 22—although the illustrated embodiment of the clutch 20 does not use the shaft 22 for magnetic conduction as part of the flux circuit, alternative embodiments of the clutch 20 could easily do so (see, for example, FIGS. 6 and 7). Additionally, the turns of the winding 34-2 in the radially outer portion $P_O$ that reside above (i.e., radially outward from) the coil bearing 48 utilize a common axial footprint with the coil bearing 48, which would otherwise be unused axial length within the clutch 20. This configuration enables an axially small footprint of the electromagnetic coil 34 with a relatively small mass/weight penalty, while also allowing suitable magnetic flux density to actuate the valve 32.

Figure 5:
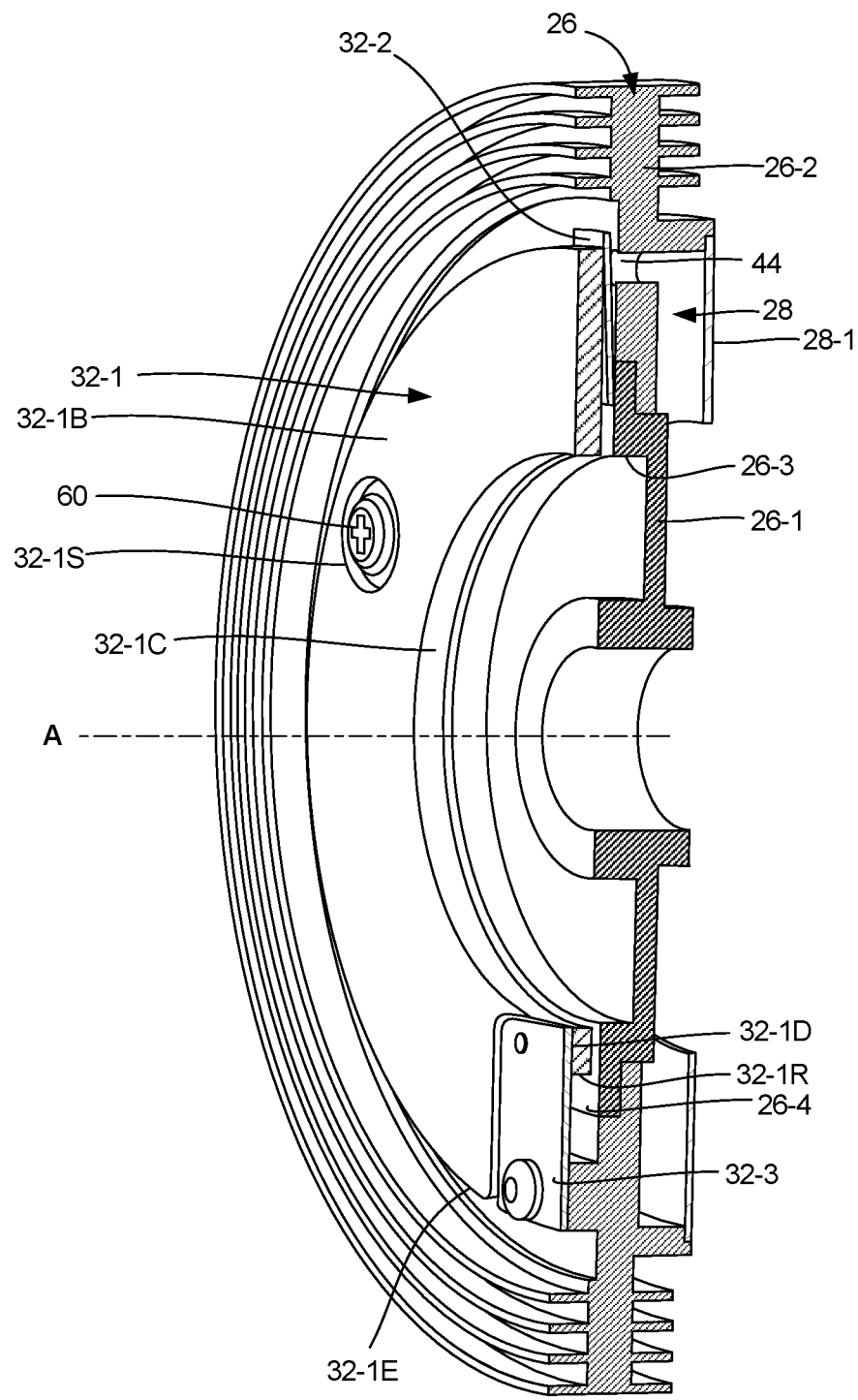
FIG. 5 is a cross-sectional perspective view of a rotor, reservoir and valve assembly of the clutch, shown in isolation.

FIG. 5 is a cross-sectional perspective view of the rotor 26, the reservoir 28 and the valve 32, shown in isolation. In the illustrated embodiment, the valve 32 is carried by and secured to the rotor 26, and the valve 32 is also positioned entirely on a rear (or driving) side of the rotor 26 opposite the reservoir 28.

As noted above, the valve 32 includes the armature 32-1 and the valve element 32-2. Additionally, as shown in FIG. 5, the valve 32 includes a spring 32-3. In the illustrated embodiment, the armature 32-1 includes an annular body 32-1B with a central opening 32-1C. The central opening 32-1C allows the annular body 32-1B to encircle the shaft 22 as well as a protruding portion of the first flux guide 24-4, the rear bearing 40, and/or other desired components (see FIGS. 2 and 3). In the illustrated embodiment, the central opening 32-1C has a slightly larger diameter than the cylindrical surface 26-3 of the conductive portion 26-1 of the rotor 26. The armature 32-1 forms a part of the flux circuit of the clutch 20, as explained above. The body 32-1B of the armature 32-1 can also press against the valve element 32-2, which can be separately attached to the rotor 26, to move the valve element 32-2 so as to cover the outlet bore 44.

In some embodiments, the configuration and operation of the valve 32 can be similar to that described in commonly-assigned U.S. Pat. No. 8,881,881, which utilizes a reed valve element. However, it should be noted that the particular configuration of the valve 32 disclosed herein is provided merely by way of example and not limitation. Numerous other types of valve configurations can be utilized in alternative embodiments, such as valves with translating or rotating elements, as well as valves that selectively cover the return bore 46. Moreover, bimetal-controlled valve assemblies can be used in the further embodiments instead of an electromagnetically controlled valve assembly, as are well-known in the art.

The spring 32-3 (also called an anchor spring), which is a leaf spring that flexes in an axial direction along a radially projected line in the illustrated embodiment, is secured between the body 32-1B of the armature 32-1 and the rotor 26 (e.g., at the non-conductive portion 26-2). In this way, the spring 32-3 flexibly mounts the armature 32-1 to the rotor 26, and can impart a biasing force to bias the armature 32-1, and the valve 32 as a whole, to an open position by default.

In the illustrated embodiment, the spring 32-3 is recessed relative to the armature 32-1, which helps to reduce both an axial length and a radial dimension of the clutch 20. An axial depression 32-1D and an adjacent radially-extending cutout 32-1R can be provided in the body 32-1B. In the illustrated embodiment, the cutout 32-1R has a generally rectangular perimeter and extends inward from an outer diameter edge 32-1E of the body 32-1B toward the central opening 32-1C, and extends entirely through the body 32-1B between opposite front and rear sides (i.e., in the axial direction), while portion of the body 32-1B remains intact between the cutout 32-1R and the central opening 32-1C. The depression 32-1D is located directly adjacent to and contiguous with the cutout 32-1R, and radially in between the cutout 32-1R and the central opening 32-1C. The depression 32-1D has a depth that extends axially through a portion of the body 32-1B from a rear side of the body 32-1B. The spring 32-3 extends into both the depression 32-1D and the cutout 32-1R, and in the illustrated embodiment the spring 32-3 is generally wholly contained within the cutout 32-1R and the depression 32-1D (absent an extreme flexure condition that deflects a portion of the spring 32-3 outside the cutout 32-1R and/or the depression 32-1D). One end of the spring 32-3 can be attached to the rotor 26 (e.g., using a suitable fastener such as a screw) at a location inside the cutout 32-1R and radially inward of the outer diameter edge 32-1E, and an opposite end of the spring 32-3 can be attached to the body 32-1B of the armature 32-1 within the depression 32-1D.

A stop opening 32-1S can also be provided in the body 32-1B of the armature 32-1, located radially in between the central opening 32-1C and the outer diameter edge 32-1E. The stop opening 32-1S can further be located radially inward of, and angularly spaced from the outlet bore 44. The stop opening 32-1S can cooperate with an armature stop 60 that can axially extend from the rotor 26. In the illustrated embodiment, the stop opening 32-1S is circular and extends entirely through the body 32-1B between opposite front and rear sides. The stop 60 in the illustrated embodiment resembles a set screw or similar threadably adjustable member, and is adjustable to establish an axial limit of movement of the armature 32-1 relative to the rotor 26. The stop 60 is arranged to align with and protrude into the stop opening 32-1S when the armature 32-1 is actuated by energization of the electromagnetic coil 34. Although only one stop opening 32-1S and stop 60 are visible in FIG. 5, one or more additional, symmetrically arranged stop openings 32-1S and stops 60 can further be provided.

Figure 6:
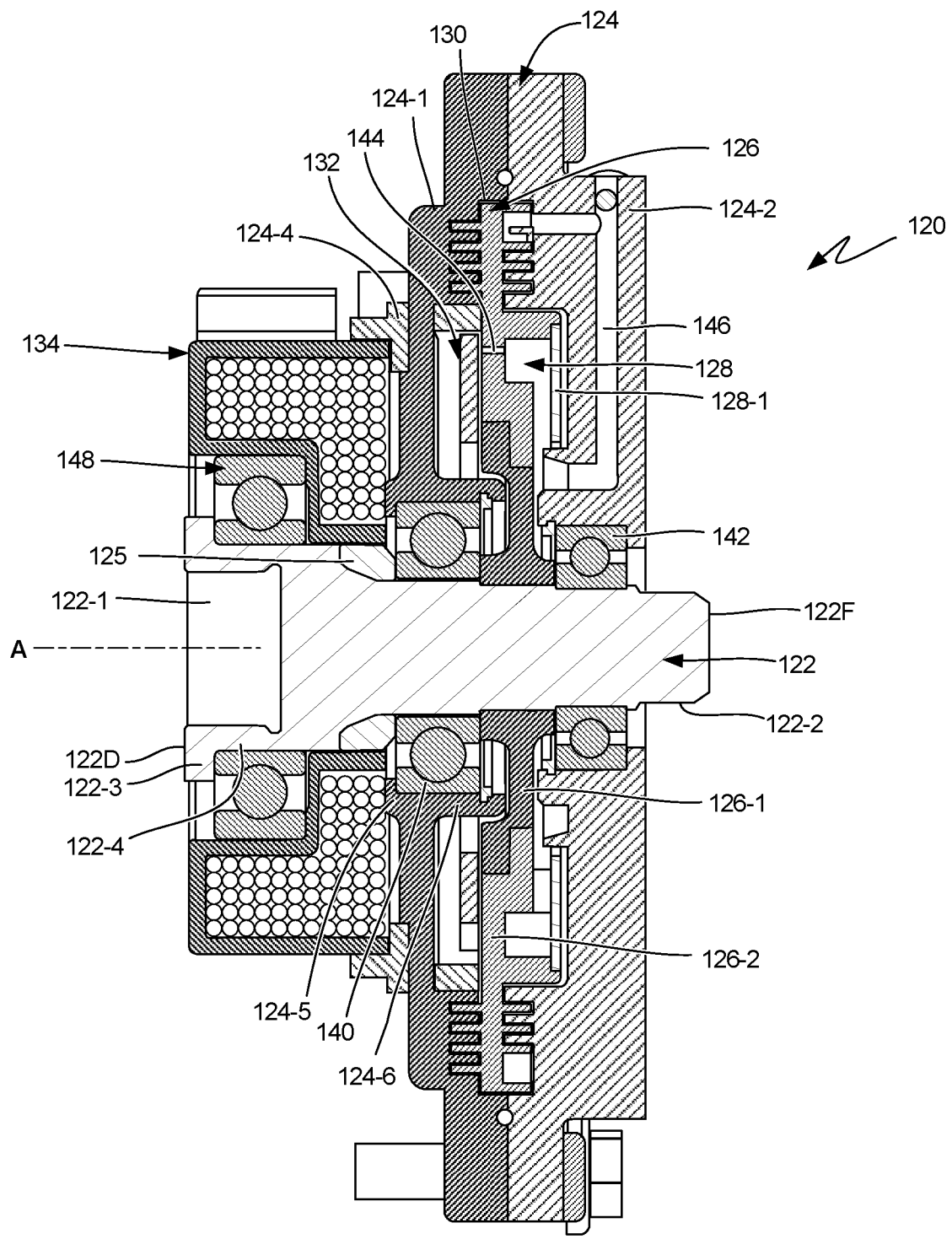
FIG. 6 is a cross-sectional view of another embodiment of a viscous clutch according to the present invention.
Figure 7:
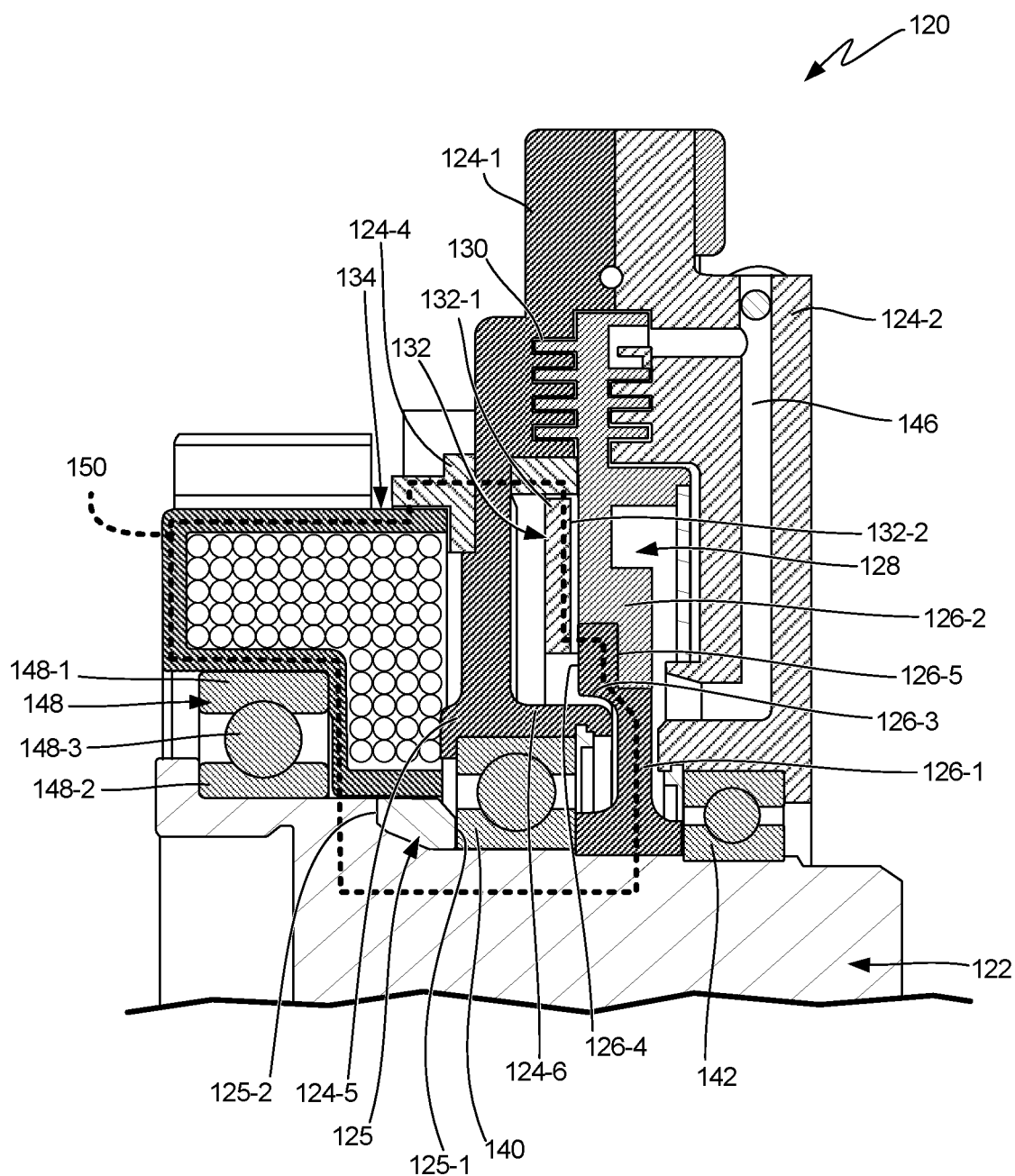
FIG. 7 is a cross-sectional view a portion the clutch of FIG. 6.

FIG. 6 is a cross-sectional view of another embodiment of a viscous clutch 120, and FIG. 7 is a cross-sectional view a portion the clutch 120. As shown in the embodiment of FIGS. 6 and 7, the clutch 120 includes a shaft 122, a housing 124, a rotor 126, a reservoir 128, a working chamber 130, a valve (or valve assembly) 132, and an electromagnetic coil 134. An axis A is illustrated that defines a rotational axis of the clutch 120. The general operation of the clutch 120 is similar to that of the clutch 20 described above, with similar components indicated by similar reference numbers increased by one hundred in FIGS. 6 and 7 and the accompanying text. Likewise, the clutch 120 incorporates most of the same features and benefits of the clutch 20. It should be noted that the illustrated embodiment of FIGS. 6 and 7 is disclosed merely by way of example and not limitation, and numerous alternative embodiments are possible, some features of which are described in the text that follows.

The shaft 122 is located at a center of the clutch 120, and extends through an entire axial length of the clutch 120 including the housing 124. As shown in the embodiment of FIG. 6, the shaft 122 includes a first engagement feature 122-1 at a first or driving end 122D (also called the rear end) and a second engagement feature 122-2 at an opposite second or front (or driven) end 122F. The shaft 122 in the illustrated embodiment is a "live" or driven input shaft, like the shaft 22. In the illustrated embodiment, the first engagement feature 122-1 is configured as an internal (female) thread, and the second engagement features 122-2 is configured as an external engagement feature, for instance, like a hex head cap screw, wrench flats, or other suitable external tooling engagement structure. Outward of the internal first engagement feature 122-1 can be a small axial stop 122-3 and a cylindrical outer surface 122-4.

The housing 124 includes a base 124-1 and a cover 124-2 secured to each other in a rotationally fixed manner. The base 124-1 can have a hub 124-5 with an axially-extending and protruding ring 124-6, which can extend in a forward direction toward the rotor 126. The housing 124 is rotationally supported on the shaft 122, allowing the housing 124 to selectively rotate relative to the shaft 122 as a function of the operational state of the clutch 120 (i.e., from approximately 0% to approximately 100% of the rotational speed of the shaft 122). In this respect, where the shaft 122 (and rotor 126) accepts a torque input to the clutch 120, the housing 124 can act as an output or output member of the clutch 120. Cooling fins can be provided on external surfaces of the housing 124, similar to with the clutch 20 described above.

In the illustrated embodiment, the base 124-1 is supported on the shaft 122 at the hub 124-5 by a rear bearing 140, and the cover 124-2 is supported on the shaft 122 by a front bearing 142. The rear and front bearings 140 and 142 are located on opposite sides of the rotor 126, and are axially spaced apart from each other. The ring 124-6 of the hub 124-5 can provide suitable axial space to accommodate and engage the rear bearing 140 with the base 124-1 of the housing 124. The bearings 140 and 142 are each single-row ball bearings in the illustrated embodiment, with the rear bearing 140 being larger than the front bearing 142, but the bearings 140 and 142 could have other configurations in alternate embodiments.

The housing 124 can be made of aluminum or another suitable material or materials, and can be a die cast part. One or more flux guide inserts can pass through the housing 124, as discussed further below. However, it should be noted that an advantage of the clutch 120 is that only a small number of flux guide inserts (e.g., a single flux guide) is needed. An output device (not shown) such as a fan can be secured to the housing 124 to accept a torque output from the clutch 120.

A spacer 125 can be provided adjacent to the rear bearing 140. In the illustrated embodiment, the spacer includes a front contact surface 125-1 and an opposite rear contact surface 125-2. The front and rear contact surfaces 125-1 and 125-2 can be parallel and axially-facing surfaces, which can be radially offset from one another. The front contact surface can engage the rear bearing 140, and the rear contact surface 125-2 can engage a shoulder of the shaft 122. In the illustrated embodiment, the spacer 125 has a hexagonal perimeter, in cross-section, to facilitate the radial offset of the front and rear contact surfaces 125-1 and 125-2 as well as to accommodate a stepped configuration of the shaft 122. The spacer 125 can be made of a non-flux conductive material, or a flux conductive material (and therefore can optionally be part of a magnetic flux circuit, as discussed below).

The rotor 126 is positioned at least partially within the housing 124, and preferably entirely within the housing 124, and can have a disk-like shape (accordingly, the rotor 126 can be called a rotor disk). The rotor 126 is rotationally fixed to the shaft 122, and rotates at all times with the shaft 122. In this respect, where the shaft 122 accepts a torque input, the rotor 126 can function as the input or input member of the clutch 120.

In the illustrated embodiment, the rotor 126 has a conductive portion 126-1 and a non-conductive portion 126-2, where "conductive" in this instance refers to magnetic flux conductivity. The conductive portion 126-1 can be made of steel or another suitable magnetic flux-conducting material (e.g., any ferromagnetic material), and the non-conductive portion 126-2 can be made of aluminum or another suitable material that does not readily conduct magnetic flux. The conductive portion 126-1 can be configured as a radially inner hub of the rotor 126 that provides structural support for the entire rotor 126, and the conductive portion 126-1 can be directly secured to the shaft 122. The non-conductive portion 126-2 can be located at a radially outer part of the rotor 126. The conductive portion 126-1 can be spaced from and separated from the reservoir 128. Moreover, in the illustrated embodiment the conductive portion 126-1 abuts both the rear and front bearings 140 and 142. In the illustrated embodiment, the conductive portion 126-1 includes an axial offset region that in turn includes a cylindrical portion with an inward-facing cylindrical surface 126-3, as well as an exposed axially rearward facing portion 126-4. Furthermore, in the illustrated embodiment, the conductive portion 126-1 forms the entirety of the rotor 126 over a given radial extent (e.g., to or beyond the cylindrical surface 126-3), and, in that respect, is a structural component that is distinguished from a non-structural flux guide insert that is embedded in or otherwise passes through surrounding structural material of a rotor solely to conduct magnetic flux. The conductive portion 126-1 can also extend radially outward from the shaft 122 over a significant distance, making the conductive portion 126-1 more than a mere hub or inner sleeve. As shown in the illustrated embodiment, the conductive portion 126-1 extends beyond the axial offset region and the cylindrical surface 126-3, but is located radially inward of the working chamber 130. Moreover, in the illustrated embodiment, the conductive portion 126-1 extends from the shaft 122 to a location at or radially outward from the ring 124-6 and/or the hub 124-5 of the base 124-1 of the housing 124 as well as outward of the rear bearing 140. The conductive and non-conductive portions 126-1 and 126-2 can overlap over a given radial distance to facilitate a structural engagement 126-5 (e.g., metallurgical or mechanical connection) between those portions. The structural engagement 126-5 can be an axially thickened portion of the rotor 126, with an axial thickness that is larger than portions of the rotor 126 both immediately radially inward and outward. The rotor 126 can axially overlap a portion of the hub 124-5 of the base 124-1 of the housing 124, such that a distal end of the axially-extending ring 124-6 of the hub 124-5 of the base 124-1 of the housing 124 axially overlaps the rotor 26 adjacent to the axial offset region at the cylindrical surface 126-3. Such an arrangement helps to promote a compact overall axial length of the clutch 120.

The reservoir 128 provides a storage volume to hold a supply of a shear fluid. In the illustrated embodiment, the reservoir 128 is provided on or within the rotor 126. A plate 128-1 of the reservoir 128 can be attached to and carried by the rotor 126 to form part of a boundary to help retain the shear fluid and to separate the reservoir 128 from other portions of the clutch 120. The plate 128-1 can be located in an interior of the clutch 120, and can be arranged at a front side of the rotor 126 that faces the cover 124-2. All or part of the shear fluid can be stored in the reservoir 128 when not needed for engagement of the clutch 120. In the illustrated embodiment, the reservoir 128 is carried by the rotor 126, such that the reservoir 128 and shear fluid contained within both rotate with the rotor 126. An outlet bore 144 is provided along the boundary of the reservoir 128 to allow the shear fluid to pass to the working chamber 130 along a fluid circuit of the clutch 120. In the illustrated embodiment, the rotor 126 forms part of the boundary of the reservoir 128, and the outlet bore 144 passes through the rotor 126. More specifically, in the illustrated embodiment the outlet bore 144 passes substantially axially through the non-conductive portion 126-2 of the rotor 126 at a location outward from the conductive portion 126-1.

The working chamber 130 is defined (and operatively positioned) between the rotor 126 and the housing 124. The working chamber 130 can extend to both sides of the rotor 126. As explained with respect to the clutch 20, selective introduction of the shear fluid (e.g., silicone oil) to the working chamber 130 can engage the clutch 120 by creating a viscous shear coupling to transmit torque between the rotor 126 and the housing 124, with the degree of torque transmission (and associated output speed) being variable as a function of the volume of shear fluid present in the working chamber 130. Concentric annular ribs, grooves and/or other suitable structures can be provided on the rotor 126 and housing 124 to increase surface area along the working chamber 130 and promote a shear coupling when the shear fluid is present in the working chamber 130, as is known in the art. Moreover, openings (not shown) can be provided in an outer diameter region of the rotor 126 to allow the shear fluid in the working chamber 130 to move between opposite side of the rotor 126, in a manner well-known in the art.

The shear fluid is pumped from the working chamber 130 back to the reservoir 128 along a return bore 146, which is located in the housing 124 in the illustrated embodiment. The pumping of the shear fluid into the return bore 146 can occur continuously using a dam or baffle (not specifically shown), as is known in the art. Such a dam can be located on the housing 124 adjacent to the inlet of the return bore 146. The fluid circuit of the clutch 120 therefore extends from the reservoir 128 to the working chamber 130 through the outlet bore 144, and then from the working chamber 130 back to the reservoir 128 through the return bore 146.

The valve 132 selectively controls flow of the shear fluid between the reservoir 128 and the working chamber 130. The clutch 120 can be electromagnetically controlled, meaning that selective energization of the electromagnetic coil 134 can control operation of the valve 132 in order to control the volume of the shear fluid present in the working chamber 130, and in turn the degree of engagement and torque transmission between the input and output members (e.g., the rotor 126 and the housing 124). In the illustrated embodiment, all moving parts of the valve 132 are contained within the housing 124, and the valve 132 is positioned in between the rotor 126 and the electromagnetic coil 134 at a rear side of the rotor 126. Similar to the valve 32 of the clutch 20 described above, magnetic flux from the electromagnetic coil 134 can move (e.g., axially pivot) an armature 132-1, which in turn can move (e.g., concurrently pivot by pressing against) a valve element 132-2 (e.g., reed valve). The armature 132-2 can be annular in shape, and can be positioned around the ring 124-6 of the hub 124-5 of the housing 124 and/or the rear bearing 140, which can help reduce the axial length of the clutch 120. Actuation of the valve element 132-2 by the armature 132-2 can selectively limit or prevent flow of the shear fluid along the fluid circuit. In the illustrated embodiment, the valve element 132-2 covers and uncovers the outlet bore 144 to selectively control flow of the shear fluid out of the reservoir 128. In some embodiments, referred to as a "fail on" configuration, the valve element 132-2 can be mechanically biased to an open position by default, with energization of the electromagnetic coil 134 causing the valve element 132-2 to move to a closed position that limits or prevents shear fluid flow. Furthermore, the valve 132 can have a configuration that is similar or identical to the valve 32 described above and shown in FIG. 5, including having a stop and a cutout for an anchor spring. In addition, because the valve 132 and the armature 132-1 are carried by the rotor disk 126, and can be configured to be pulled toward the rotor disk 126 upon energization of the electromagnetic coil 134, there is no need for a stop to prevent motion relative to the housing 124, which can help reduce the axial length of the clutch 120.

In the illustrated embodiment, the electromagnetic coil 134 is supported on the shaft 122 by a coil bearing 148 that includes inner and outer races 148-1 and 148-2 and rolling elements 148-3. More specifically, the electromagnetic coil 134 can be supported at the driving end 122D of the shaft 122 outside of the housing 124, with the coil bearing 148 abutting the axial stop 122-3. The electromagnetic coil 134 is typically rotationally fixed by a tether or the like (not shown), with the coil bearing 148 allowing relative rotation between the non-rotating electromagnetic coil 134 and the rotatable shaft 122. The electromagnetic coil 134 and the coil bearing 148 can together provide a coil assembly similar to that described above with respect to FIG. 4.

FIG. 7 illustrates a magnetic flux circuit of the clutch 120 that is represented schematically by a dashed line 150. The housing 124 includes a flux guide 124-4 made of a magnetic flux-conductive material that is secured or embedded in the base 124-1 at a rear or driving side of the rotor 126 in the illustrated embodiment. The flux guide 124-4 can protrude from the base 124-1 at opposite front and/or rear sides. The flux guide 124-4 can allow for the transmission of magnetic flux through the housing 124, which is otherwise typically made of a material like aluminum that does not efficiently transmit magnetic flux. In the illustrated embodiment, the flux guide 124-4 has opposite front and rear ends that are radially offset relative to each other in a stepwise manner, with a radially inwardly projecting ring.

The magnetic flux circuit of the clutch 120 that transmits magnetic flux to facilitate actuation of the valve 132 has the following configuration in the illustrated embodiment. The flux circuit extends from the electromagnetic coil 134 to the flux guide 124-4 across a first air gap. Next, the flux circuit extends from the flux guide 124-4 to the armature 132-1 of the valve 132 across a second air gap. The flux circuit then extends from the armature 132-1 of the valve 132 to the conductive portion 126-1 of the rotor 126 across a third air gap. The third air gap can be located adjacent to the axially rearward surface 126-4. Moreover, the third air gap can effectively close when the armature 132-1 is actuated and drawn toward or against the rotor 126. Next, the flux circuit extends from the conductive portion 126-1 of the rotor 126 to the shaft 122. Lastly, the flux circuit extends from the shaft 122 back to the electromagnetic coil 134 across a fourth air gap.

Some aspects of the flux circuit in the illustrated embodiment of the clutch 120 are as follows. Any or all of the first, second, and fourth air gaps can be oriented radially. Radially-oriented air gaps in a flux circuit can be kept relatively small, with relatively tight tolerances, and help to promote efficient and consistent flux transmission. The third air gap can be oriented axially. As noted above, the third air gap can effectively close when the armature 132-1 is actuated and drawn toward or against the rotor 126. The first air gap can be located outward of a radially inner perimeter of the electromagnetic coil 134, and the fourth air gap can be located inside of a radially outer perimeter of the electromagnetic coil 134. The rear bearing 140 can be located inside the flux circuit, while the front bearing 142 and the coil bearing 148 can each be located outside the flux circuit. Aside from passing through the conductive portion 126-1 of the rotor 126, the flux circuit also can be arranged at a driving or rear side of the clutch 120.

The stepped configuration of the electromagnetic coil 134 can facilitate close proximity to the shaft 122, thereby allowing flux transmission between the electromagnetic coil 134 and the shaft 122 across a relatively small (fourth) radial air gap (see also FIG. 4 and the accompanying description). Such a stepped electromagnetic coil configuration also avoids the need for additional flux guides, which would otherwise tend to undesirably increase manufacturing complexity, extend overall axial and/or radial dimensions of the clutch, and increase mass.

Discussion of Possible Embodiments

The following are non-exclusive descriptions of possible embodiments of the present invention.

A viscous clutch can include an input member; an output member; a working chamber defined between the input member and the output member; a reservoir to hold a supply of a shear fluid, the reservoir fluidically connected to the working chamber by a fluid circuit; a valve, wherein the valve controls a flow of the shear fluid between the reservoir and the working chamber along the fluid circuit; a bearing; and an electromagnetic coil supported by the bearing, wherein selective energization of the electromagnetic coil actuates the valve, the electromagnetic coil including a coil housing and a winding that forms multiple turns within an interior volume of the coil housing, wherein the coil housing has a stepped configuration to at least partially accommodate the bearing within a first step.

The viscous clutch of the preceding paragraph can optionally include, additionally and/or alternatively, any one or more of the following features, configurations and/or additional components:

the interior volume of the coil housing can include a radially outer volume and a radially inner volume, wherein the radially outer volume is located radially outward of the first step, and the radially inner volume overlaps the bearing;

the radially outer volume and the radially inner volume of the coil housing can be adjoining and open to one another, and the turns of the winding can span both the radially outer volume and the radially inner volume;

the bearing can include an outer race and rolling elements engaged with the outer race, and the turns of the winding within the interior volume of the coil housing can at least partially span the rolling elements in both axial and radial directions;

the coil housing can be configured as a cup;

the winding can be potted within the coil housing;

a shaft, wherein the bearing supports the electromagnetic coil on the shaft;

the shaft can be rotationally fixed to the input member to rotate with the input member at all times;

the input member can comprise a rotor disk, and the output member can comprise a housing surrounding the rotor disk;

the shaft can extend entirely through the housing;

the electromagnetic coil can be positioned outside the housing;

the shaft can have an internal engagement feature at a first end and an internal engagement feature at an opposite second end;

the shaft can have an internal engagement feature at a first end and an external engagement feature at an opposite second end;

the interior volume of the coil housing can be L-shaped in cross-section;

the valve can include an armature having an annular body with a central opening and a stop opening;

an armature stop can be arranged to align with and protrude into the stop opening in the annular body of the armature when the armature is actuated by energization of the electromagnetic coil;

the armature stop can comprise a threadably adjustable member configured to adjust an axial limit of movement of the armature; and/or the valve can include an armature having an annular body with a radially-extending cutout and an adjacent axial depression portion, the valve including a leaf spring that flexibly mounts the armature to the input member, wherein the leaf spring is wholly contained within the radially-extending cutout and the axial depression.

A method can include: winding a wire within an interior volume of an electromagnetic coil housing to provide a coil, wherein the wire makes multiple turns within the interior volume so as to span a radially outer volume and an adjoining radially inner volume, wherein the radially outer volume is located radially outward of a step formed by a wall of the electromagnetic coil housing; and engaging a bearing with the electromagnetic coil housing at the step.

The method of the preceding paragraph can optionally include, additionally and/or alternatively, any one or more of the following features, configurations and/or additional steps:

supporting the electromagnetic coil housing with the bearing adjacent to a magnetic flux circuit that passes through an electromagnetically-actuated valve of a viscous clutch.

An electromagnetic coil assembly for use with a clutch can include: a bearing including an outer race, an inner race, and a plurality of rolling elements positioned between the outer race and the inner race; a winding; and a coil housing defined by a wall supported on the outer race of the bearing, wherein the coil housing further defines an interior volume in which a plurality of turns of the winding are located, the turns of the winding located opposite the bearing across the wall, wherein the interior volume includes a first portion having a first axial depth and a second portion having a second axial depth, the first axial depth being greater than the second axial depth, wherein the first portion is located radially outward of the outer race of the bearing and the second portion extends radially inward of the outer race of the bearing.

The electromagnetic coil assembly of the preceding paragraph can optionally include, additionally and/or alternatively, any one or more of the following features, configurations and/or additional components:

the coil housing can have a notch defined by the wall, wherein the bearing is contained within the notch in an axial direction;

the first and second portions of the interior volume can be contiguous and open to one another, and the turns of the winding can span both the first and second portions;

the turns of the winding can span both the first and second portions of the interior volume;

the turns of the winding within the interior of the coil housing can at least partially span the rolling elements of the bearing in both axial and radial directions;

the coil housing can be configured as a cup;

the winding can be potted within the coil housing; and/or the interior volume of the coil housing formed by the first and second portions can be L-shaped in cross-section;

A viscous clutch can include: a shaft; a rotor disk rotationally affixed to the shaft to rotate at all times with the shaft, wherein the rotor disk includes a conductive portion made of a magnetic flux conductive material and another portion made of a different material; a housing; a working chamber defined between the rotor disk and the housing, wherein a torque coupling between the rotor disk and the housing is selectively provided as a function of a volume of a shear fluid present in the working chamber; a reservoir to hold a supply of the shear fluid, the reservoir fluidically connected to the working chamber by a fluid circuit, wherein the reservoir is carried by the rotor disk; a valve, wherein the valve controls a flow of the shear fluid between the reservoir and the working chamber along the fluid circuit, the valve including an armature; an electromagnetic coil, wherein selective energization of the coil controls actuation of the valve, the electromagnetic coil located at an opposite side of the rotor disk from the reservoir; a first flux guide that passes through the housing; and a second flux guide that passes through the housing and is located inward of the first flux guide, wherein a magnetic flux circuit extends from the electromagnetic coil to the first flux guide, then to the armature of the valve, then to the conductive portion of the rotor disk, then to the second flux guide, and then back to the electromagnetic coil.

The viscous clutch of the preceding paragraph can optionally include, additionally and/or alternatively, any one or more of the following features, configurations and/or additional components:

the magnetic flux circuit crosses a first air gap between the electromagnetic coil and the first flux guide, a second air gap between the first flux guide and the armature of the valve, a third air gap between the armature of the valve and the conductive portion of the rotor disk, a fourth air gap between the conductive portion of the rotor and the second flux guide, and a fifth air gap between the second flux guide and the electromagnetic coil;

the first and fifth air gaps can each be oriented radially;

the fourth air gap can be oriented radially;

the second air gap can be oriented radially;

the third air gap can be oriented axially;

the second flux guide can form a hub of a base portion of the housing that is supported on the shaft by a first housing bearing;

a cover portion of the housing can be supported on the shaft by a second housing bearing;

the first and second housing bearings can each be single row bearings;

the conductive portion of the rotor disk can form a hub that is supported on the shaft;

the conductive portion of the rotor disk can include a cylindrical surface that faces the second flux guide across an air gap;

the shaft can extend entirely through the housing;

the electromagnetic coil can be positioned outside the housing;

the electromagnetic coil can be supported on the shaft by a coil bearing;

the electromagnetic coil can include: a coil housing; and a winding that forms multiple turns within an interior volume of the coil housing, wherein the coil housing has a stepped configuration to at least partially accommodate the coil bearing within a first step at an exterior of the coil housing;

the interior volume of the coil housing can include a radially outer volume and a radially inner volume, wherein the radially outer volume is located radially outward of the first step, and wherein the radially inner volume overlaps the coil bearing;

the radially outer volume and the radially inner volume of the coil housing can be adjoining and open to one another, and the turns of the winding can span both the radially outer volume and the radially inner volume;

the coil bearing can include an outer race and rolling elements engaged with the outer race;

the turns of the winding within the interior volume of the coil housing can at least partially span the rolling elements of the coil bearing in both axial and radial directions;

the shaft can have an internal engagement feature at a first end and an internal engagement feature at an opposite second end;

the shaft can have an internal engagement feature at a first end and an external engagement feature at an opposite second end;

the armature can have an annular body with a radially-extending cutout and an adjacent axial depression portion, the valve including a leaf spring that flexibly mounts the armature to the rotor disk;

the leaf spring can be wholly or partially contained within the radially-extending cutout and the axial depression;

the armature can have an annular body with a central opening and a stop opening;

an armature stop can be secured to the rotor disk, wherein the armature stop is arranged to align with and protrude into the stop opening in the annular body of the armature when the armature is urged toward to the rotor disk; and/or the armature stop can include a threadably adjustable member configured to adjust an axial limit of movement of the armature.

A viscous clutch can include a shaft; a rotor disk rotationally affixed to the shaft to rotate at all times with the shaft, wherein the rotor disk includes a conductive portion made of a magnetic flux conductive material and another portion made of a different material, wherein the conductive portion forms a hub of the rotor disk that contacts the shaft; a housing having a base and a cover, wherein the base includes a hub with an axially-extending ring; a working chamber defined between the rotor disk and the housing, wherein a torque coupling between the rotor disk and the housing is selectively provided as a function of a volume of a shear fluid present in the working chamber; a reservoir to hold a supply of the shear fluid, the reservoir fluidically connected to the working chamber by a fluid circuit, wherein the reservoir is carried by the rotor disk; a valve, wherein the valve controls a flow of the shear fluid between the reservoir and the working chamber along the fluid circuit, the valve including an armature, wherein the armature is located radially outward of the axially-extending ring of the hub of the base of the housing; an electromagnetic coil, wherein selective energization of the coil controls actuation of the valve, the electromagnetic coil located at an opposite side of the rotor disk from the reservoir; and a flux guide that passes through the housing, wherein a magnetic flux circuit extends from the electromagnetic coil to the flux guide, then to the armature of the valve, then to the conductive portion of the rotor disk, then to the shaft, and then back to the electromagnetic coil.

The viscous clutch of the preceding paragraph can optionally include, additionally and/or alternatively, any one or more of the following features, configurations and/or additional components:

the magnetic flux circuit can cross a first air gap between the electromagnetic coil and the flux guide, a second air gap between the flux guide and the armature of the valve, a third air gap between the armature of the valve and the conductive portion of the rotor disk, a fourth air gap between the shaft and the electromagnetic coil;

the first and fourth air gaps can each be oriented radially;

the second air gap can be oriented radially;

the third air gap can be oriented axially;

the base of the housing can be supported on the shaft by a first housing bearing engaged with the hub of the base, and the cover of the housing can be supported on the shaft by a second housing bearing, and the first and second housing bearings can each be single row bearings;

the conductive portion of the rotor disk can include a surface that faces the armature across an axial air gap;

the conductive portion of the rotor disk can be spaced from the reservoir;

the electromagnetic coil can be positioned outside the housing;

the electromagnetic coil can be supported on the shaft by a coil bearing;

the electromagnetic coil can include a coil housing; and a winding that forms multiple turns within an interior volume of the coil housing, wherein the coil housing has a stepped configuration to at least partially accommodate the coil bearing within a first step at an exterior of the coil housing;

the interior volume of the coil housing can include a radially outer volume and a radially inner volume, the radially outer volume can be located radially outward of the first step, and the radially inner volume can overlap the coil bearing;

the radially outer volume and the radially inner volume of the coil housing can be adjoining and open to one another;

the turns of the winding can span both the radially outer volume and the radially inner volume;

the coil bearing can include an outer race and rolling elements engaged with the outer race, and the turns of the winding within the interior volume of the coil housing can at least partially span the rolling elements in both axial and radial directions;

the shaft can have an internal engagement feature at a first end, and the shaft can have an internal engagement feature at an opposite second end;

the shaft can have an internal engagement feature at a first end, and the shaft can have an external engagement feature at an opposite second end;

the armature can have an annular body with a radially-extending cutout and an adjacent axial depression portion, the valve can include a leaf spring that flexibly mounts the armature to the rotor disk, and the leaf spring can be wholly contained within the radially-extending cutout and the axial depression;

the armature can have an annular body with a central opening and a stop opening, and the viscous clutch can further include an armature stop secured to the rotor disk, and the armature stop can be arranged to align with and protrude into the stop opening in the annular body of the armature when the armature is urged toward to the rotor disk;

the armature stop can comprise a threadably adjustable member configured to adjust an axial limit of movement of the armature;

the shaft can extend entirely through the housing;

the base of the housing can be supported on the shaft by a first housing bearing engaged with the hub of the base, the viscous clutch can further include a spacer abutting the first housing bearing, and the spacer can have radially offset front and rear contact surfaces;

the base of the housing can be supported on the shaft by a first housing bearing, the cover of the housing can be supported on the shaft by a second housing bearing, the first housing bearing can be located inside the magnetic flux circuit, and the second housing bearing can be located outside the magnetic flux circuit; and/or the rotor disk can have an axial offset, and a distal end of the axially-extending ring of the hub of the base of the housing axially can overlap the rotor disk adjacent to the axial offset.

A method of operating a viscous clutch can include energizing an electromagnetic coil to generate magnetic flux; passing the magnetic flux from the electromagnetic coil to a flux guide in a housing of the viscous clutch across a first air gap; passing the magnetic flux from the first flux guide to an armature of a valve across a second air gap; passing the magnetic flux from the armature of a valve to a conductive hub portion of a rotor to across a third air gap; actuating the valve to control flow of a shear fluid within the viscous clutch as a function of movement of the armature; passing the magnetic flux from the conductive hub portion of the rotor through a live shaft; and passing the magnetic flux from the live shaft to the electromagnetic coil across a fourth air gap.

A method of operating a viscous clutch can include: energizing an electromagnetic coil to generate magnetic flux; passing the magnetic flux from the electromagnetic coil to a first flux guide in a housing of the viscous clutch across a first air gap; passing the magnetic flux from the first flux guide to an armature of a valve across a second air gap; passing the magnetic flux from the armature to a conductive portion of the rotor across a third air gap; actuating the valve to control flow of a shear fluid within the viscous clutch as a function of movement of the armature; passing the magnetic flux from the conductive portion of a rotor to a second flux guide in the housing across a fourth air gap; and passing the magnetic flux from the second flux guide to the electromagnetic coil across a fifth air gap.

A viscous clutch can include: a rotor disk; a housing; a working chamber defined between the rotor disk and the housing, wherein a torque coupling between the rotor disk and the housing is selectively provided as a function of a volume of a shear fluid present in the working chamber; a reservoir to hold a supply of the shear fluid, the reservoir fluidically connected to the working chamber by a fluid circuit, wherein the reservoir is carried by the rotor disk; a valve, wherein the valve controls a flow of the shear fluid between the reservoir and the working chamber along the fluid circuit, the valve including an armature, wherein the armature has an annular body with a radially-extending cutout and an adjacent axial depression portion, the valve including a leaf spring that flexibly mounts the armature to the rotor disk, wherein the leaf spring is wholly contained within the radially-extending cutout and the axial depression; and an electromagnetic coil, wherein selective energization of the coil controls actuation of the valve.

A viscous clutch can include: a rotor disk; a housing; a working chamber defined between the rotor disk and the housing, wherein a torque coupling between the rotor disk and the housing is selectively provided as a function of a volume of a shear fluid present in the working chamber; a reservoir to hold a supply of the shear fluid, the reservoir fluidically connected to the working chamber by a fluid circuit, wherein the reservoir is carried by the rotor disk; a valve, wherein the valve controls a flow of the shear fluid between the reservoir and the working chamber along the fluid circuit, the valve including an armature, wherein the armature has an annular body with a central opening and a stop opening; an electromagnetic coil, wherein selective energization of the coil controls actuation of the valve; and an armature stop secured to the rotor disk, wherein the armature stop is arranged to align with and protrude into the stop opening in the annular body of the armature when the armature is urged toward to the rotor disk.

The viscous clutch of the preceding paragraph can optionally include, additionally and/or alternatively, any one or more of the following features, configurations and/or additional components:

the armature stop can comprise a threadably adjustable member configured to adjust an axial limit of movement of the armature.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention. For instance, while described as being for light duty applications, a clutch of the present invention could be scaled up for medium or heavy duty applications as well. Moreover, features and configurations described with respect to one embodiment can be incorporated into another embodiment, as desired.

The invention claimed is:

1. A viscous clutch comprising:
a shaft;
a rotor disk rotationally affixed to the shaft to rotate at all times with the shaft, wherein the rotor disk includes a conductive portion made of a magnetic flux conductive material and another portion made of a different material, wherein the conductive portion forms a hub of the rotor disk that contacts the shaft;
a housing having a base and a cover, wherein the base includes a hub with an axially-extending ring;
a working chamber defined between the rotor disk and the housing, wherein a torque coupling between the rotor disk and the housing is selectively provided as a function of a volume of a shear fluid present in the working chamber;
a reservoir to hold a supply of the shear fluid, the reservoir fluidically connected to the working chamber by a fluid circuit, wherein the reservoir is carried by the rotor disk;
a valve, wherein the valve controls a flow of the shear fluid between the reservoir and the working chamber along the fluid circuit, the valve including an armature, wherein the armature is located radially outward of the axially-extending ring of the hub of the base of the housing;
an electromagnetic coil, wherein selective energization of the coil controls actuation of the valve, the electromagnetic coil located at an opposite side of the rotor disk from the reservoir; and
a flux guide that passes through the housing,
wherein a magnetic flux circuit extends from the electromagnetic coil to the flux guide, then to the armature of the valve, then to the conductive portion of the rotor disk, then to the shaft, and then back to the electromagnetic coil.

2. The viscous clutch of claim 1, wherein the magnetic flux circuit crosses a first air gap between the electromagnetic coil and the flux guide, a second air gap between the flux guide and the armature of the valve, a third air gap between the armature of the valve and the conductive portion of the rotor disk, a fourth air gap between the shaft and the electromagnetic coil.

3. The viscous clutch of claim 2, wherein the first and fourth air gaps are each oriented radially.

4. The viscous clutch of claim 3, wherein the second air gap is oriented radially.

5. The viscous clutch of claim 4, wherein the third air gap is oriented axially.

6. The viscous clutch of claim 1, wherein the base of the housing is supported on the shaft by a first housing bearing engaged with the hub of the base, wherein the cover of the housing is supported on the shaft by a second housing bearing, and wherein the first and second housing bearings are each single row bearings.

7. The viscous clutch of claim 1, wherein the conductive portion of the rotor disk includes a surface that faces the armature across an axial air gap.

8. The viscous clutch of claim 1, wherein the conductive portion of the rotor disk is spaced from the reservoir.

9. The viscous clutch of claim 1, wherein the electromagnetic coil is positioned outside the housing.

10. The viscous clutch of claim 1, wherein the electromagnetic coil is supported on the shaft by a coil bearing.

11. The viscous clutch of claim 10, wherein the electromagnetic coil comprises:

a coil housing; and a winding that forms multiple turns within an interior volume of the coil housing, wherein the coil housing has a stepped configuration to at least partially accommodate the coil bearing within a first step at an exterior of the coil housing.

12. The viscous clutch of claim 11, wherein the interior volume of the coil housing includes a radially outer volume and a radially inner volume, wherein the radially outer volume is located radially outward of the first step, and wherein the radially inner volume overlaps the coil bearing.

13. The viscous clutch of claim 12, wherein the radially outer volume and the radially inner volume of the coil housing are adjoining and open to one another, and wherein the turns of the winding span both the radially outer volume and the radially inner volume.

14. The viscous clutch of claim 11, wherein the coil bearing includes an outer race and rolling elements engaged with the outer race, wherein the turns of the winding within the interior volume of the coil housing at least partially span the rolling elements in both axial and radial directions.

15. The viscous clutch of claim 1, wherein the shaft has an internal engagement feature at a first end, and wherein the shaft has an external engagement feature at an opposite second end.

16. The viscous clutch of claim 1, wherein the shaft extends entirely through the housing.

17. The viscous clutch of claim 1, wherein the base of the housing is supported on the shaft by a first housing bearing engaged with the hub of the base, the viscous clutch further comprising a spacer abutting the first housing bearing, wherein the spacer has radially offset front and rear contact surfaces.

18. The viscous clutch of claim 1, wherein the base of the housing is supported on the shaft by a first housing bearing, wherein the cover of the housing is supported on the shaft by a second housing bearing, wherein the first housing bearing is located inside the magnetic flux circuit, and wherein the second housing bearing is located outside the magnetic flux circuit.

19. The viscous clutch of claim 1, wherein the rotor disk has an axial offset, and wherein a distal end of the axially-extending ring of the hub of the base of the housing axially overlaps the rotor disk adjacent to the axial offset.

* * * * *